Figure 1:
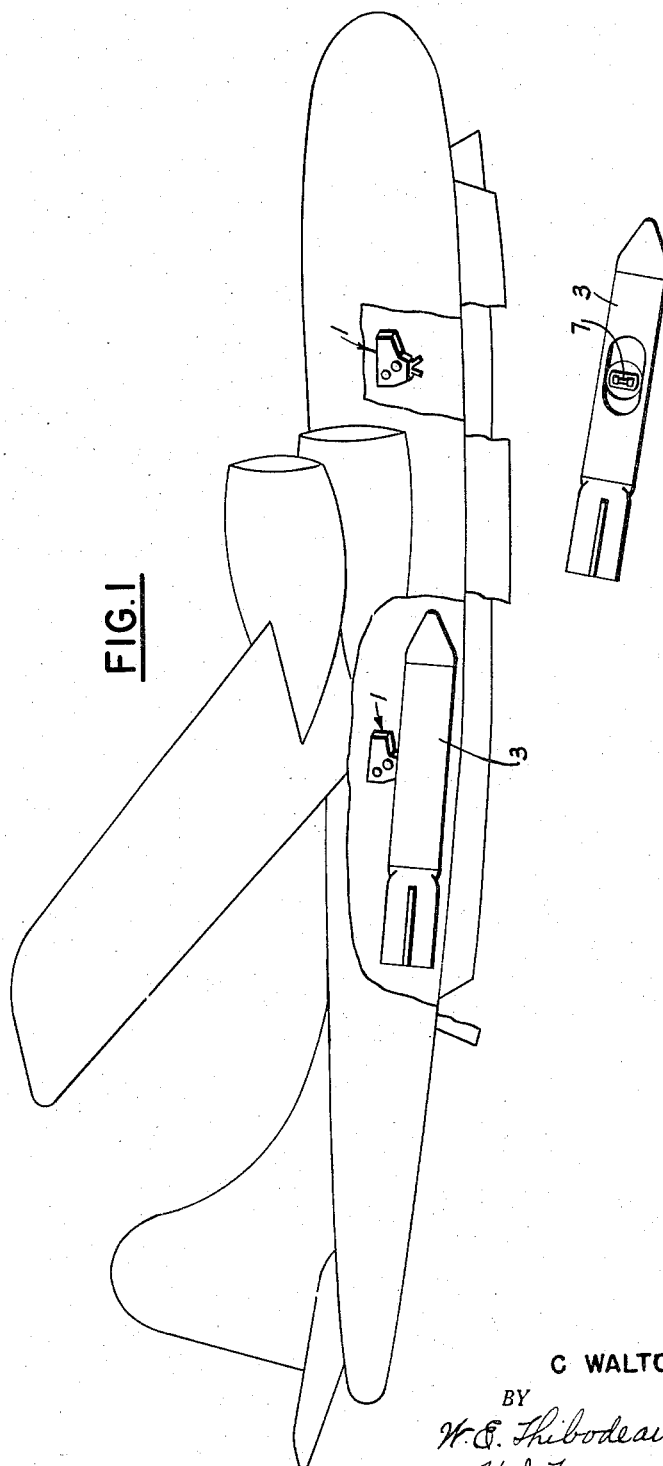

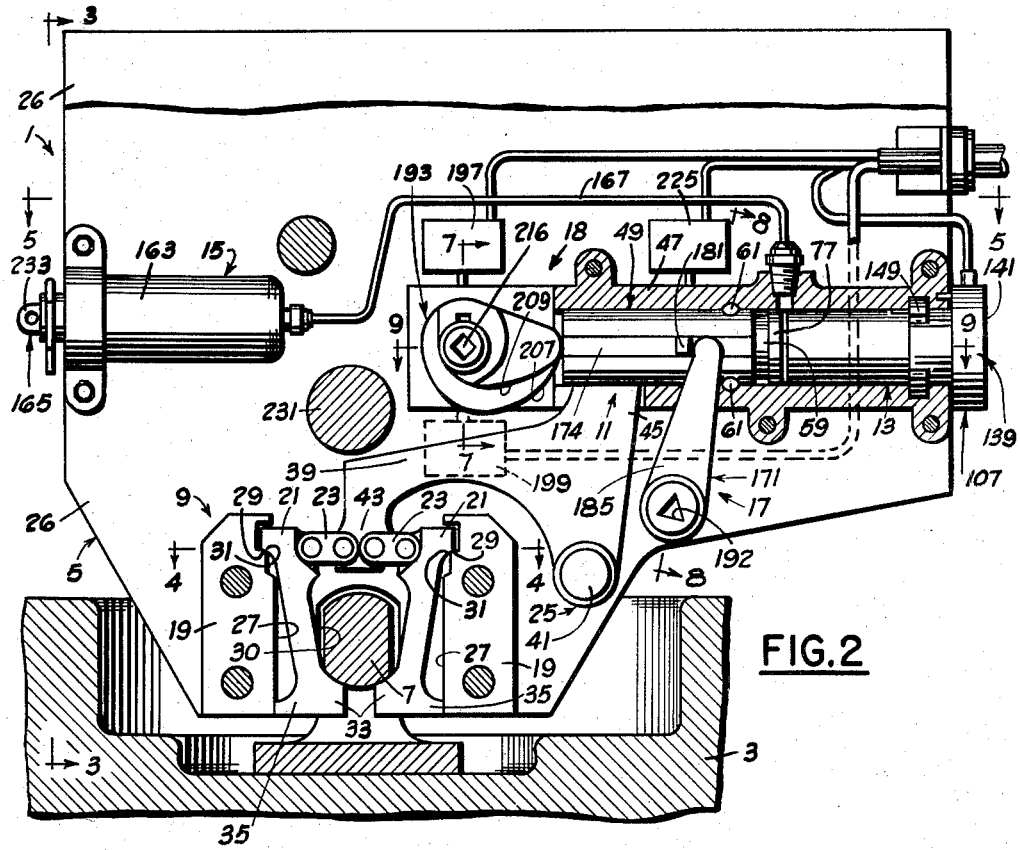
FIG. 2
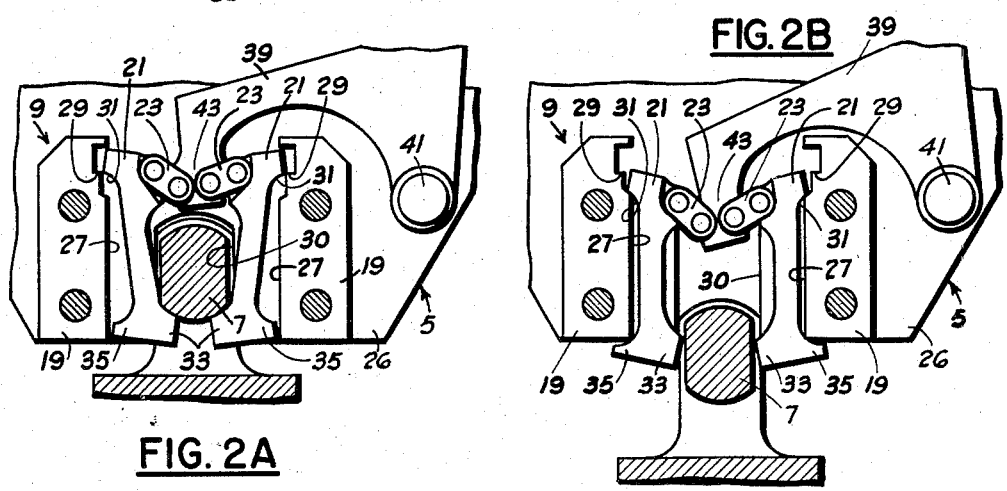
FIG. 2A
FIG. 2B

Sept. 23, 1958 C W. MUSSER 2,852,982
AERIAL CARRY AND RELEASE MECHANISM
Filed April 21, 1954 9 Sheets-Sheet 3

INVENTOR.
C WALTON MUSSER
BY W. E. Thibodeau, A. W. Dew
and H. J. Forman ATTORNEYS:

Sept. 23, 1958    C W. MUSSER    2,852,982
AERIAL CARRY AND RELEASE MECHANISM
Filed April 21, 1954    9 Sheets-Sheet 4

INVENTOR.
C WALTON MUSSER
BY
ATTORNEYS

Sept. 23, 1958     C W. MUSSER     2,852,982
AERIAL CARRY AND RELEASE MECHANISM
Filed April 21, 1954     9 Sheets-Sheet 5

INVENTOR.
C WALTON MUSSER
BY
W. E. Thibodeau, A. W. Dew
and H. J. Forman ATTORNEYS Sept. 23, 1958 C. W. MUSSER 2,852,982
AERIAL CARRY AND RELEASE MECHANISM
Filed April 21, 1954 9 Sheets-Sheet 6
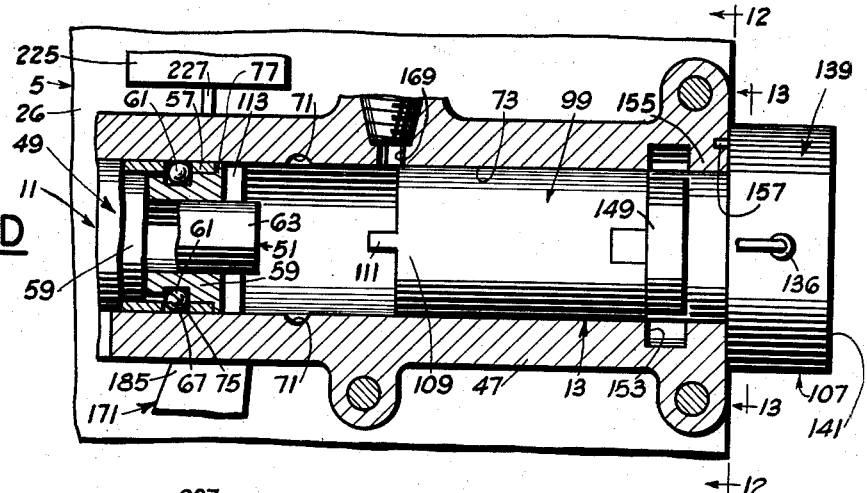
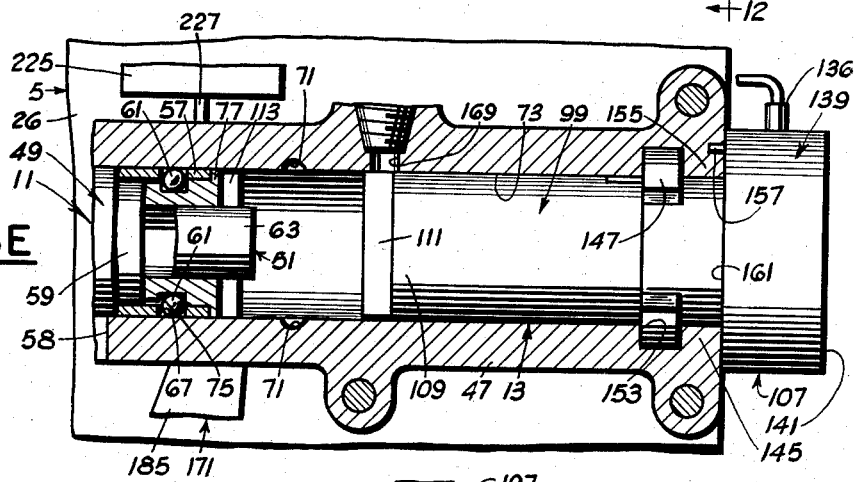
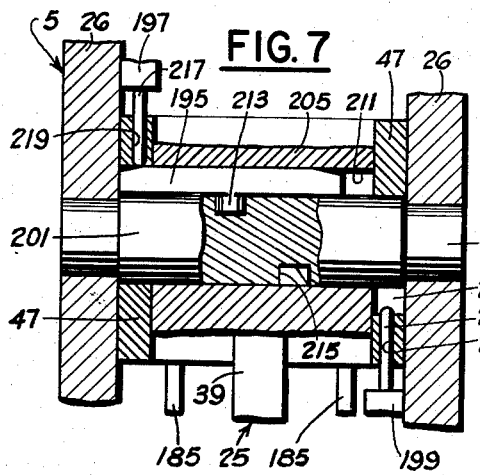
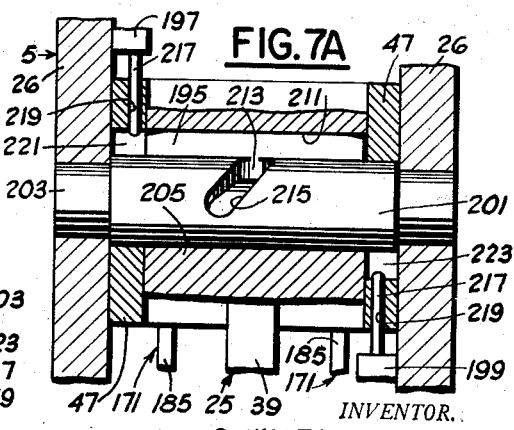
INVENTOR.
C WALTON MUSSER
BY
W. E. Thibodeau, A. W. Dew
and H. I. Forman
ATTORNEYS Sept. 23, 1958 C W. MUSSER 2,852,982
AERIAL CARRY AND RELEASE MECHANISM
Filed April 21, 1954 9 Sheets-Sheet 7
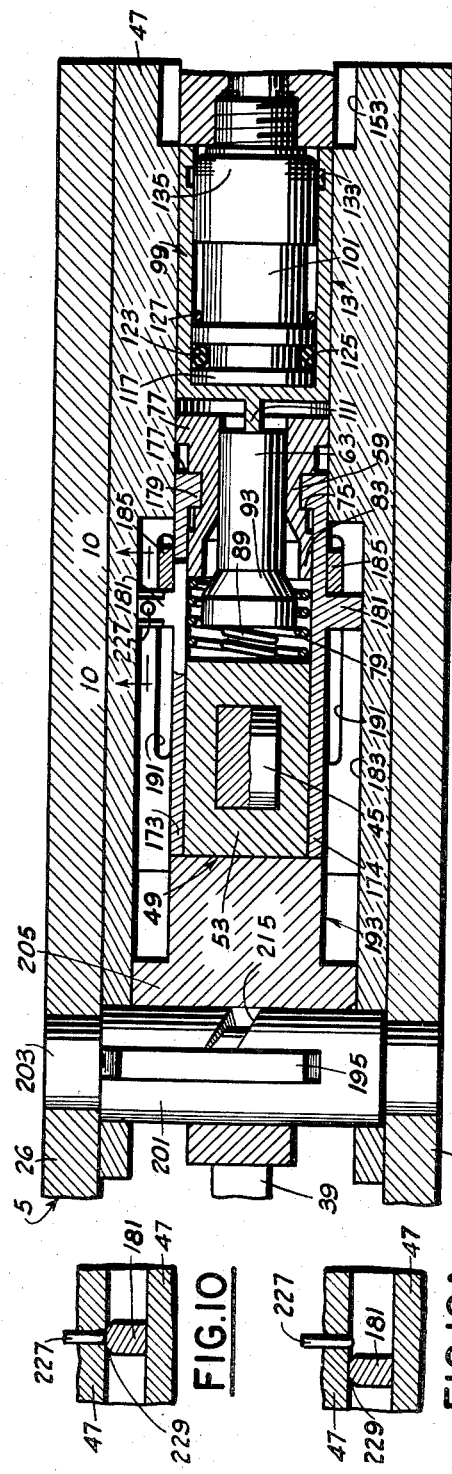
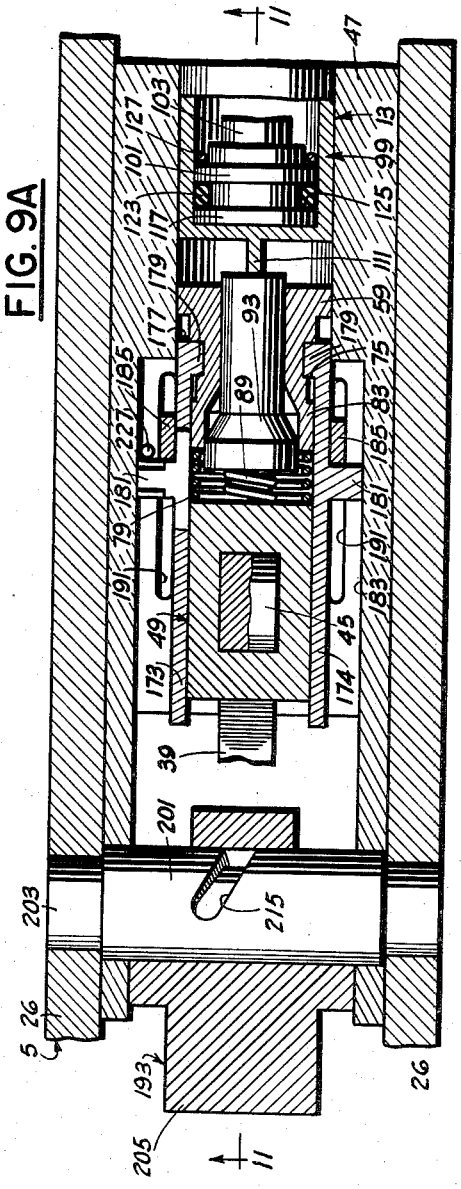
INVENTOR.
C WALTON MUSSER
BY
W. E. Thibodeau, A. W. Dew
and H. J. Forman
ATTORNEYS:

Sept. 23, 1958        C. W. MUSSER        2,852,982
AERIAL CARRY AND RELEASE MECHANISM
Filed April 21, 1954        9 Sheets-Sheet 8

INVENTOR.
C WALTON MUSSER
BY W. E. Thibodeau, A. W. Dew
and H. L. Forman ATTORNEYS Sept. 23, 1958  C W. MUSSER  2,852,982
AERIAL CARRY AND RELEASE MECHANISM
Filed April 21, 1954  9 Sheets-Sheet 9

INVENTOR.
C WALTON MUSSER
BY W. E. Thibodeau, A. W. Dew
and H. J. Forman ATTORNEYS.

United States Patent Office 2,852,982
Patented Sept. 23, 1958

2,852,982

AERIAL CARRY AND RELEASE MECHANISM

C Walton Musser, Philadelphia, Pa., assignor to the United States of America as represented by the Secretary of the Army Application April 21, 1954, Serial No. 424,790

3 Claims. (Cl. 89—1.5)

(Granted under Title 35, U. S. Code (1952), sec. 266)

The invention described herein may be manufactured and used by or for the Government for governmental purposes without the payment of any royalty thereon.

The present invention relates to aerial carry and release mechanisms and particularly to a mechanism for transporting an object which is intended for subsequent release such as a bomb, rocket, or other projectile or object of the type which normally is vertically dropped.

Although support and release mechanisms heretofore proposed have proved satisfactory for the purposes intended, present day requirements dictate that the apparatus be capable of safely and efficiently handling extremely heavier loads than heretofore encountered. For example, in the case of a bomb release mechanism, it should be capable of suspending and releasing bombs weighing 12,000 pounds or more. Under extreme load conditions, either because of complicated mechanisms having a multiplicity of parts, or because the equipment was not designed to operate under such conditions, or, further, because of jamming of the mechanism, many prior art arrangements cannot be depended upon.

For purposes of explanation, the present invention will be described with respect to a bomb rack useful in suspending and safely releasing, from within a bomb bay, a high explosive store or bomb having an ultimate load of 48,000 pounds.

Therefore, it is a primary object of the present invention to provide an improved apparatus which is capable of sustaining and releasing extremely heavy loads and which can be actuated at the will of an operator in more than one way.

It is another object of the present invention to provide a support and release apparatus which is particularly useful for military applications such as the transportation and release of articles carried by aircraft.

Still another object of the present invention is to provide a support and release mechanism which is capable of being electrically or mechanically actuated.

A further object of the present invention is to provide a support and release mechanism which will operate positively under a wide range of ambient conditions.

Still further it is an object of the present invention to provide a support and release mechanism which will insure safety under all conditions of operation including loading, carrying and releasing.

It is also an object of the present invention to provide a support and release mechanism which is simple in operation, easy to construct and service, and which is highly efficient in operation.

In accordance with the present invention, the support and release apparatus comprises a pair of jaw members adapted to support and to be subsequently released. A lever operated linkage interconnects the jaw members for simultaneous movement in a vertical direction between support and release positions. The lever operated linkage is controlled by selectively operating one of three independent mechanisms. The three mechanisms comprise (1) an electrically responsive fluid pressure-operating device, (2) a manually operated fluid pressure-operating device, and (3) a manually operated mechanical device. Safety devices are provided to prevent inadvertent operation during loading and carrying conditions as well as to lock the components against premature operation after loading and prior to flight and readiness to operate.

Figure 2C:
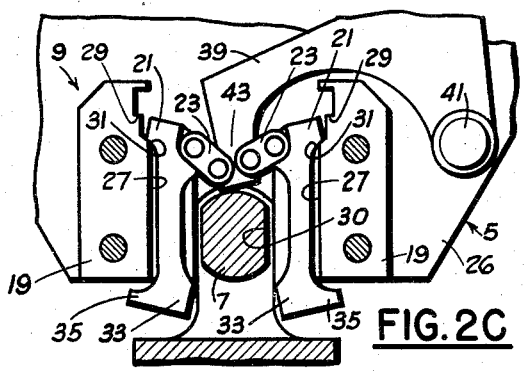
Figure 4:
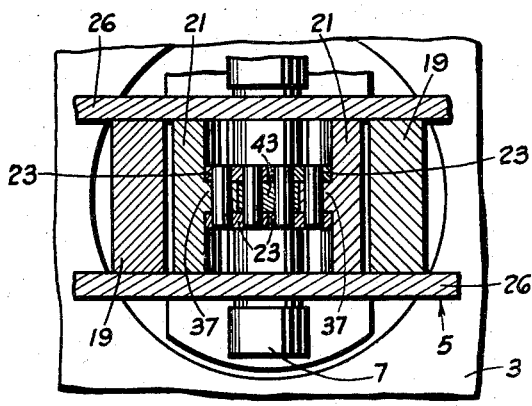
Figure 3:
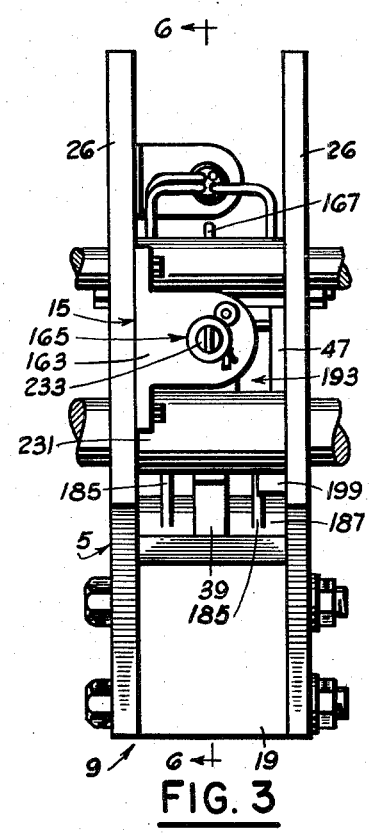
Figure 5:
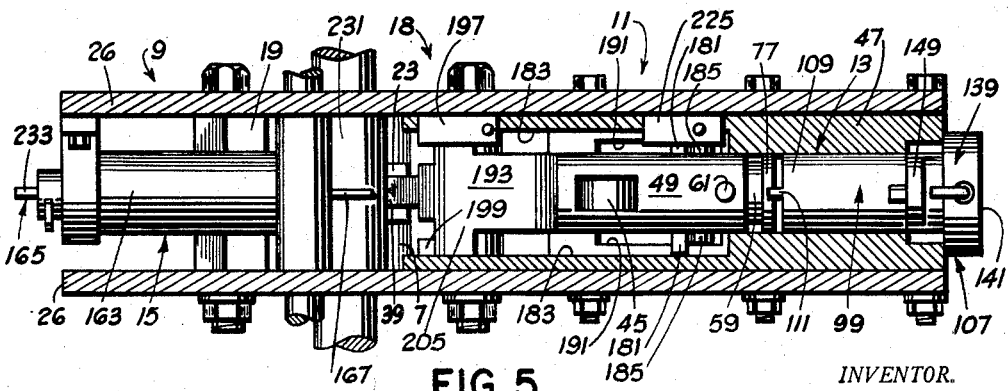
Figure 6:
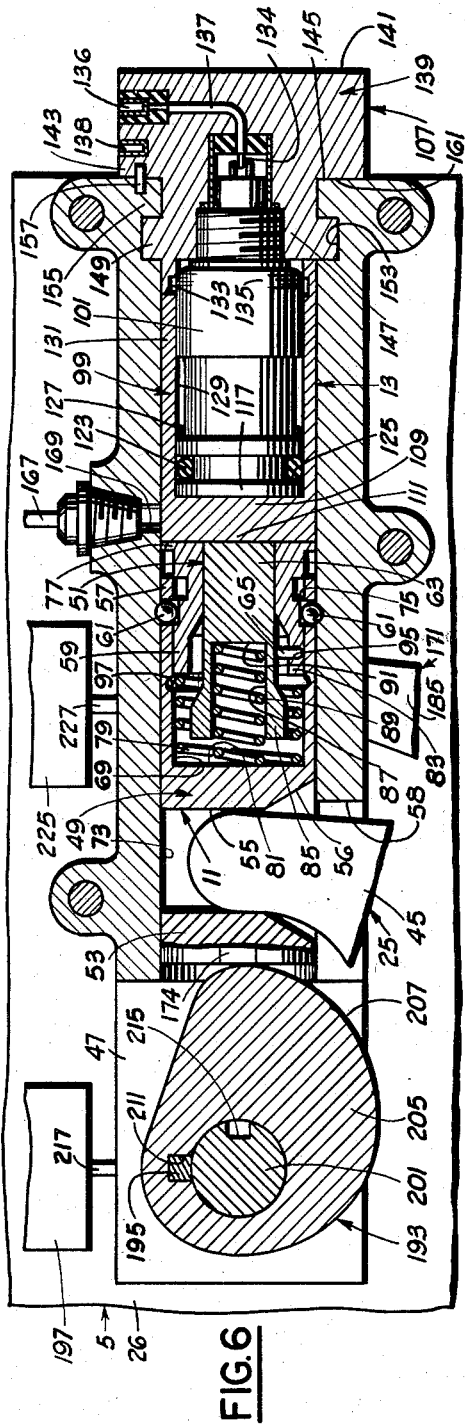
Figure 6A:
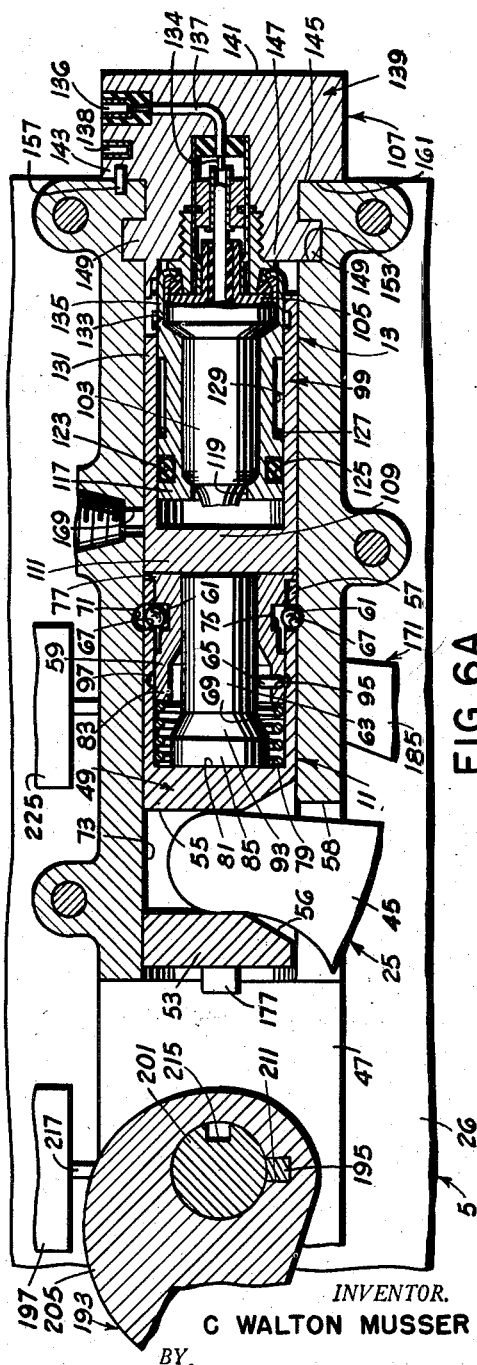
Figure 6B:
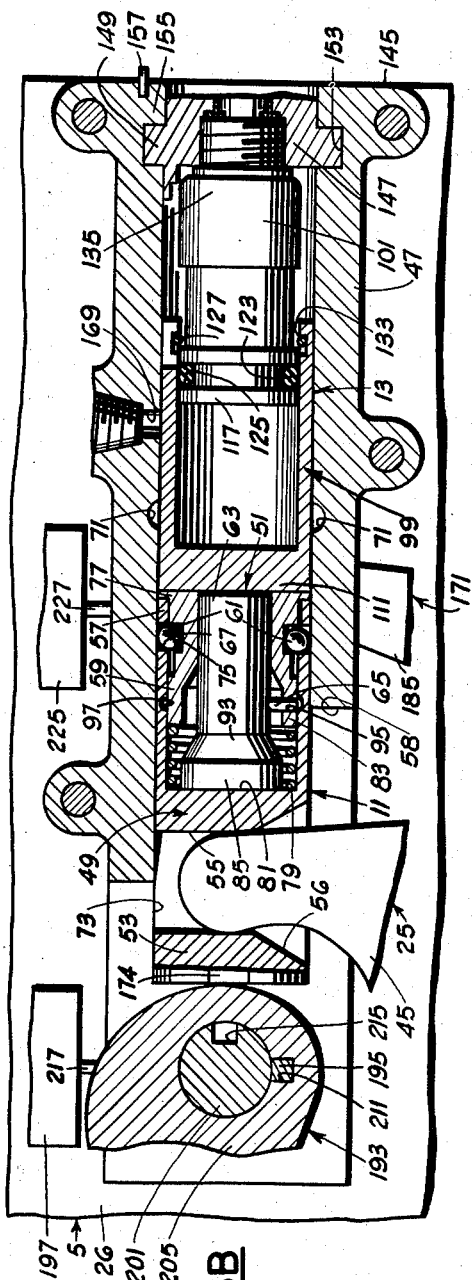
Figure 6C:
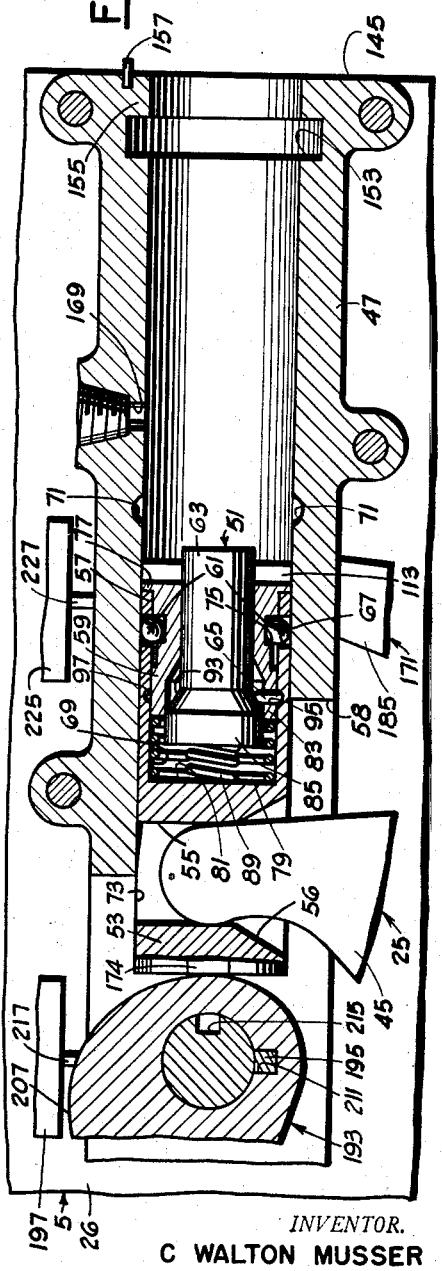
Figure 9B:
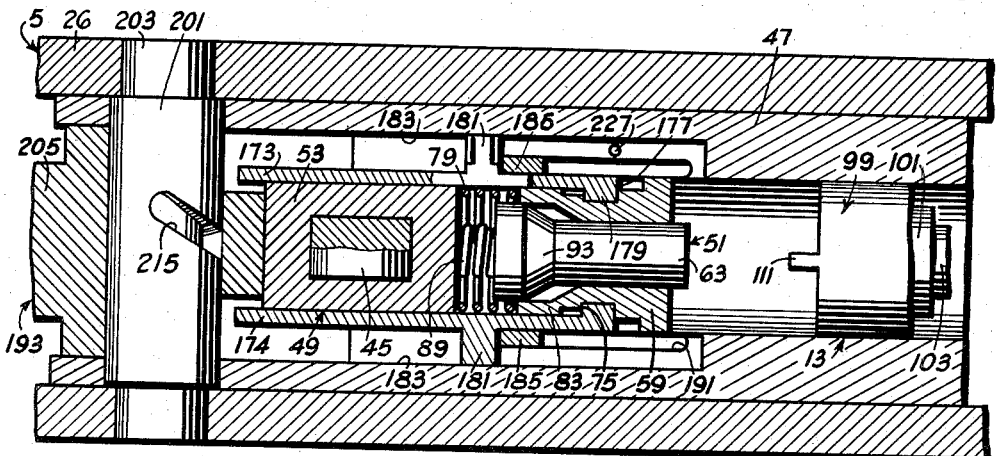
Figure 11:
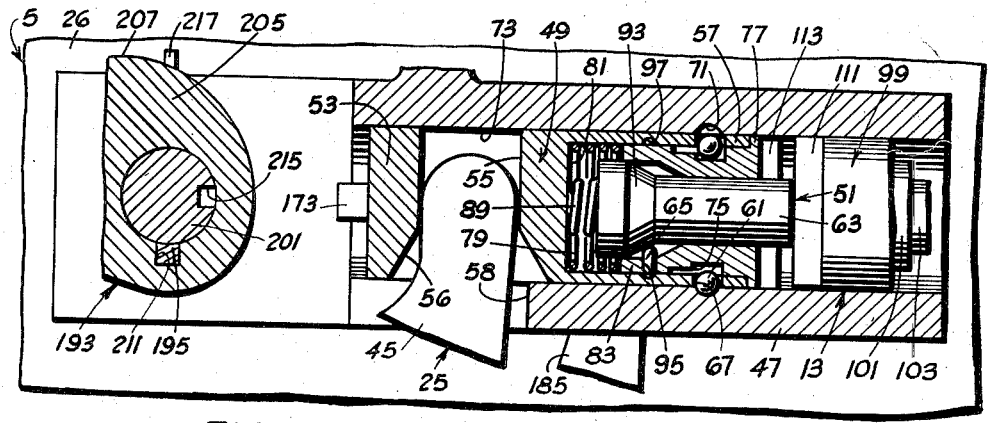
Figure 11A:
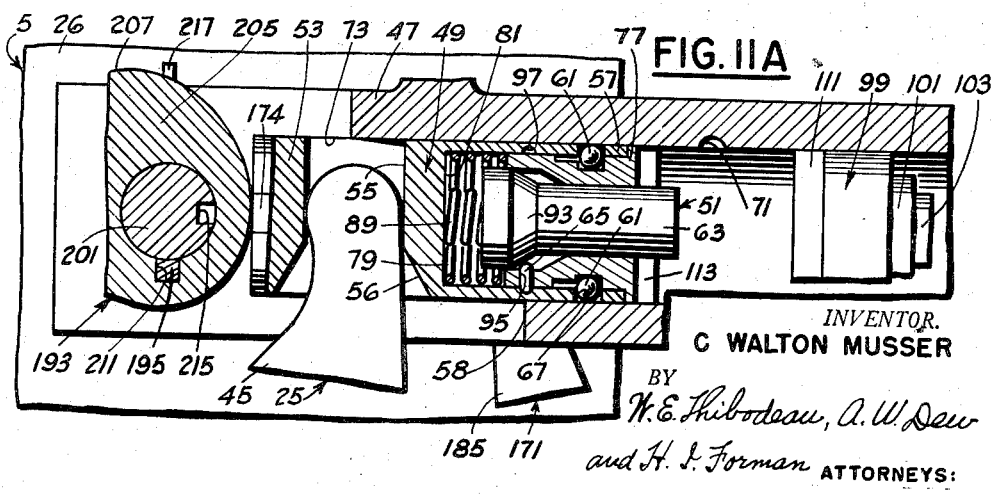
Figure 7B:
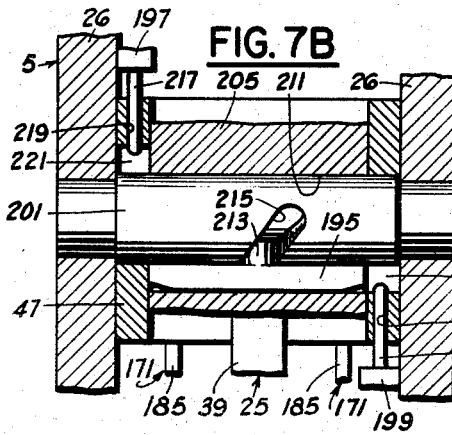
Figure 7C:
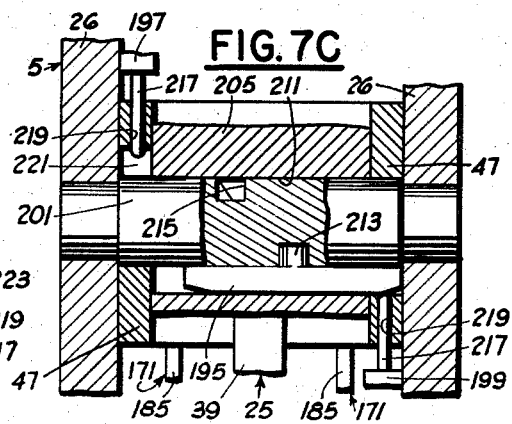
Figure 8:
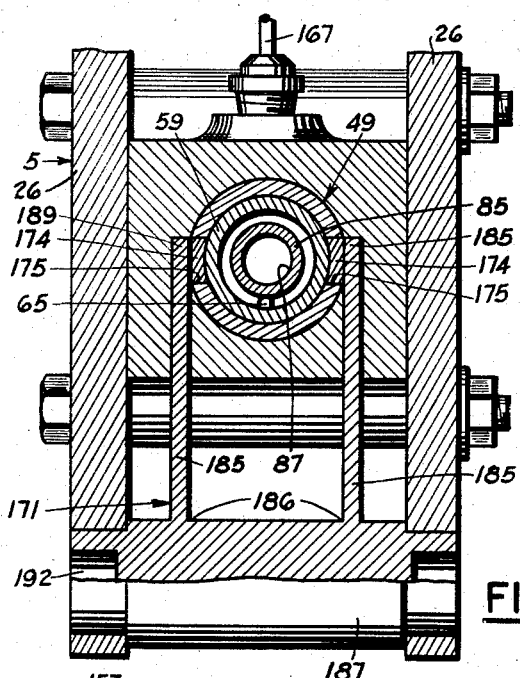
Figure 12:
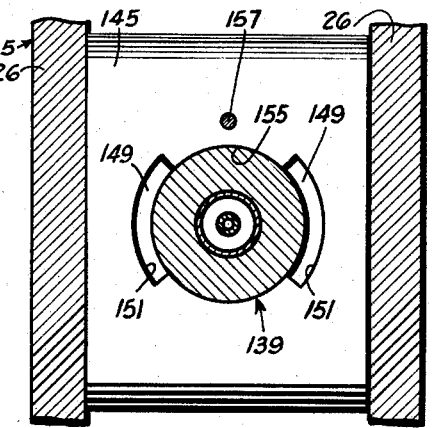
Figure 12A:
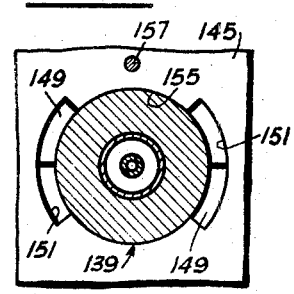
Figure 13:
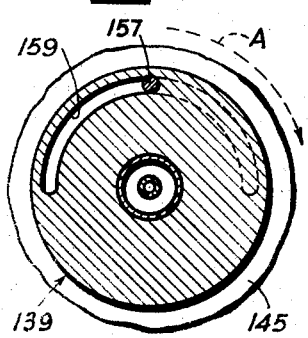
Figure 12B:
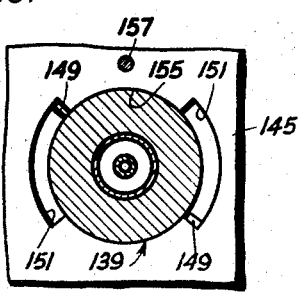

The novel features characteristic of the present invention, as well as additional objects and advantages thereof, will be understood better from the following detailed description when read in connection with the accompanying drawings in which, Figure 1 is an illustrative view showing two bomb release mechanisms in accordance with the present invention installed in the fuselage of an airplane and further showing a bomb supported by one of the mechanisms and another bomb shortly after being released by the other mechanism, the released bomb having been rotated ninety degrees from its normal dropping position to show structural details, Figure 2 is a side elevation of a bomb release mechanism in accordance with a preferred embodiment of the present invention, one of the housing plates having been broken away to show details of internal structure and with the mechanism shown locked in load supporting position, Figure 2A is a view of a portion of the mechanism shown in Figure 2 particularly showing the load supporting jaw members and interconnecting linkage in a partially released position, Figure 2B is a view similar to Figure 2A but showing the jaw members in a complete load release position, Figure 2C is a view similar to Figure 2A but showing the jaw members in a reload position, Figure 3 is an end elevation of the apparatus shown in Figure 2, taken along the line 3—3 of Figure 2, and with the bomb removed, Figure 4 is a sectional view of the supporting members and their interconnecting linkage, taken along the line 4—4 of Figure 2, Figure 5 is a top view, partly in section and partly in elevation, of the apparatus shown in Figure 2 taken along the line 5—5 thereof, and with portions of the emergency operating system fluid pressure-transmitting tube and portions of the hook retaining group housing removed, Figure 6 is a sectional view of the apparatus shown in Figure 3, take nalong the line 6—6 thereof, the parts being shown in load engaging, locked position, Figure 6A is a view, similar to Figure 6, illustrating a stage in the operation of the release mechanism by means of the electrically responsive fluid pressure-operating device, and showing the operator safety devices moved to an unlocked position, Figure 6B is a view, similar to Figure 6A, showing a succeeding stage in the operation of the apparatus, the operating device, hereinafter called the operator, having been moved to a position to effect movement of the jaw members to a release position, Figure 6C is a view, similar to Figure 6B, showing a succeeding stage in the operation of the apparatus, the relationship of parts being shown in a position representative of a first stage in the process of reloading, the detonated cartridge and its container having been removed, Figure 6D is a view of a portion of the apparatus shown in Figure 6C showing a first step in the process of reloading a new cartridge in the apparatus, Figure 6E is a view similar to Figure 6D, the parts being shown with the new cartridge disposed in the cartridge retainer and the retainer end wall locked in place, Figures 7, 7A, 7B and 7C are sectional views of the block safety group, taken along the line 7—7 of Figure 2, showing a series of successive steps in unlocking the apparatus preparatory to operating the release mechanisms, Figure 8 is a sectional view of a portion of the apparatus shown in Figure 2, taken along the line 8—8 thereof, the view showing particularly the manual mechanical means for operating the release mechanism, Figures 9, 9A and 9B are top views, in section, taken along the line 9—9 of Figure 2, showing successive steps in operating the release mechanism by means of the mechanical means, Figures 10 and 10A are sectional views, taken along the line 10—10 of Figure 9, showing successive steps in operating a micro-switch useful in a sequential firing system embodying a plurality of bomb release devices, Figures 11 and 11A are side views, in section, taken along the line 11—11 of Figure 9A the parts being shown in the same relative positions as in Figures 9A and 9B respectively, Figures 12, 12A and 12B are sectional views, taken along the line 12—12 of Figure 6D, showing successive steps in replacing the cartridge of the electrically responsive operating device, and Figure 13 is a sectional view, taken along the line 13—13 of Figure 6D, showing the means for insuring proper orientation of the cartridge.

Referring more particularly to the drawings wherein similar reference numerals have been used to designate corresponding parts throughout, a single preferred embodiment of the present invention is shown and described herein as applied to a bomb release mechanism of the type customarily employed in aircraft.

THE BOMB RELEASE MECHANISM

The bomb release mechanism 1 is customarily mounted in one or more bomb bays of an airplane in such a position as to be capable of receiving and carrying a bomb 3 in flight and for subsequent release for dropping in a vertical direction as the craft approaches a target. The bomb release mechanism 1 may be considered as a self-contained unit mounted in a housing or walled enclosure 5 the lower surface of which is provided with an opening capable of receiving the suspension bar or lug 7 of the bomb 3.

The release mechanism 1 of the present invention consists of a hook group 9, a hook retaining group 11, an electrically responsive, fluid pressure-operating system 13, an emergency or manually actuated, fluid pressure-operating system 15, a manually operated mechanical system 17, and a block safety group 18.

*The hook group*

The hook group 9 comprises a pair of support plates 19, a pair of support hooks or members 21, connecting links 23, and an operating lever 25. The support plates are mounted or secured between opposite sides 26 of the bomb release housing 5 and are disposed in spaced apart relation over an opening provided in the lower surface of the housing. The adjacent sides or faces 27 of the support plates are disposed substantially parallel to each other and the upper portions thereof are recessed to provide shoulders 29 for sustaining the load carried by the support hooks 21. The sides 26 of the bomb release housing are provided with aligned slots 30 to accommodate the bomb lug 7.

The support hooks or members 21 operate normally as a pair to engage the bomb lug or suspension bar 7 and to effect release thereof. The hooks are disposed in the space defined by the support plates 19 and the sides 26 of the bomb release housing 5. The hooks are supported for freedom of movement normally in a vertical direction, that is, movement substantially parallel to the adjacent faces 27 of the support plates, so that they can be operated between an upper, support position (Figure 2) and a lower, release position (Figure 2B). The hook members 21 are each of the same design and have lateral extensions or shoulder portions 31 provided at their upper extremities. Each shoulder portion 31 at the upper extremity extends outwardly toward the support plate face 27 associated therewith. The upper shoulder portion 31 is dimensioned to fit within the support plate recess so that it will rest upon the support plate shoulder 29 thereby to sustain the load.

The lower extremity of each hook member 21 is provided with an inwardly extending shoulder portion 33, the purpose of which is to engage the bomb suspension lug 7 in a manner to support the bomb. Extending in an opposite direction therefrom is another shoulder 35 which, in the upper support position of the hooks, abuts the support plate face 27 adjacent thereto. The lower shoulders 33, 35 are dimensioned in such a manner that the inwardly extending shoulders 33 will close upon each other sufficiently to confine the bomb lug 7 within the space between the hook members 21 when disposed in the upper support position. As a safety measure, should either one of the hook members 21 break, the inwardly extending shoulder 33 of the other hook member is arranged to extend sufficiently across the opening to prevent release of the bomb.

The pair of hook members 21 are interconnected for simultaneous operation through links 23 pivotally attached between the operating lever 25 and the upper ends of the hooks. Two pairs of connecting links 23 are provided, one pair for each hook member. Respective ones of each pair are pivotally attached to and disposed on opposite sides of a boss or tongue 37 which extends from the upper end of each hook.

The operating lever 25 (see Fig. 2) is arranged to function as a lever of the first class and is somewhat L-shaped. One arm 39 of the lever extends in a horizontal direction from a pivot or fulcrum point 41 disposed between the bomb release housing sides 26 and functions to transmit a force necessary to operate the hooks 21. The free end of this arm is provided with an extension or depending portion 43 which is pivotally connected to the two pairs of connecting links 23 thereby to effect simultaneous operation of the hook members 21 through the links. The other arm 45 (see Figs. 2, 5) of the lever extends upwardly from the pivot point 41 and functions to receive and transmit a motivating force to operate the hooks in releasing the load.

*The hook retaining group*

The hook retaining group 11 (see Figs. 2, 5) transmits the motivating force to the operating lever 25 and comprises a housing 47, an operator 49, and detent locking means 51. The housing comprises a member which is of rectangular cross section and which has a central bore extending therethrough. The operator 49 is mounted for slidable movement within the housing bore and together with the housing, the two function in like manner to a piston and cylinder. The hook retaining group housing is mounted within the bomb release housing 5 in a position above the fulcrum 41 of the operating lever 25 and it is disposed in such a manner that the operator normally moves in a horizontal direction.

The operator 49 comprises a cylindrical member having one end 53 thereof closed and the opposite end 57 (see Figs. 6, 6D, 6E) thereof provided with an axial bore. The closed end portion 53 is provided with a lateral opening 55 which extends therethrough and is oriented with the opening extending in a vertical direction. The opening 55 is of a size to accommodate the free end of the vertically extending arm 45 of the operating lever 25 and the lower portion 56 of the housing defining the opening is tapered outwardly to allow clearance for the lever arm as the operator is moved horizontally in actuating the lever. The lower portion of the hook retaining group housing 47 is also provided with a slot 58 which extends from the end thereof adjacent to the operating lever 25 inwardly to an extent necessary to freely accommodate the upwardly extending arm 45 of the lever as it rotates about its pivotal axis 41. The open, opposite end 57 of the operator has a detent release sleeve 59 slidably mounted therein which partly controls the functioning of the detent locking means 51.

The detent locking means 51 includes the detent release sleeve 59, as well as a plurality of ball detents 61, an inner cylinder or plunger 63 and one or more locking pins or detents 65. Adjacent to the open end 57 of the operator a plurality of apertures 67 are disposed to extend radially through the cylindrical wall 69. The ball detents 61 are disposed respectively in the apertures 67 and are of a size in diameter greater than the thickness of the operator wall 69 in order to effect locking engagement with indentations or pockets 71 provided on the adjacent cylindrical inner surface 73 of the hook retainer housing 47. A stepped groove 75 is provided in the outer cylindrical surface of the detent release sleeve 59 which functions together with the ball detents 61 to effect locking action of the operator in the housing 47. As shown particularly in Figure 6 of the drawings, the larger diameter portion of the stepped groove, that is, the shallower portion of the groove, is dimensioned to hold the detents within the pockets 71 of the hook retainer housing when the large diameter groove is disposed opposite or aligned with the operator apertures 67, thereby restricting movement of the operator within the hook retaining group housing. The deeper portion of the groove, that is, the smaller diameter portion of the stepped groove, is dimensioned so that when it is moved into alignment with the operator apertures 67, as shown particularly in Figure 6A of the drawings, the detents are free to move radially inwardly thereby releasing the operator for slidable movement within the housing. The outer end 77 of the detent release sleeve 59 extends outwardly to provide an annular flange or shoulder, the function of which is to limit inward movement of the sleeve. A compression or coil spring 79 is disposed within the hollow interior of the operator for location between the bottom 81 of the operator bore and the end 83 of the sleeve opposite the flanged outer end 77 for biasing the sleeve outwardly. Thus, travel of the sleeve inwardly is limited by the flanged outer end 77 of the sleeve engaging the open end of the operator and travel outwardly is limited by locking ball detents 61 engaging the inwardly disposed edge of the annular stepped groove 75 and the pockets 71 on the inner surface of the hook retainer housing.

The inner cylinder or plunger 63 is provided as a safety means to guard against the bomb hooks 21 being closed and locked in engagement with a bomb during loading operations until a cartridge of the electrically responsive, fluid pressure-operating group 13 has been first installed and oriented in position. The plunger is mounted for slidable, longitudinal movement within and relative to the detent release sleeve 59. The end 85 disposed inwardly of the operator 49 is provided with an axial bore 87. A compression or coil spring 89 is mounted within the axial bore 87, concentric with the coil spring 79 and is arranged to abut the bottom 81 of the operator bore and the bottom 91 of the plunger bore 87 thereby to bias the plunger outwardly. A portion of the inner end 85 of the plunger is of larger diameter externally than the remainder of the plunger in order to provide a cam surface 93. Adjacent to the inwardly disposed end 83 of the detent release sleeve one or more apertures 95 are disposed to extend through the wall thereof. The locking pins or detents 65 are arranged respectively within the apertures 95 and are of a size greater than the wall thickness of the sleeve. An annular groove 97 is provided on the inner surface of the operator to receive the locking pins 65 when the detent release sleeve is disposed in a release position, the locking pins being forced outwardly by the plunger cam surface 93 in response to expansion of the coil spring 89. Thus, with the detent release sleeve 59 locked against movement from its release position within the operator 49, as shown particularly in Figure 6C of the drawings, the operator is freely movable within the housing 47 and the operating lever 25 and the hook members 21 are also freely movable.

*The electrically responsive, fluid pressure-operating system*

The electrically responsive fluid pressure-operating system 13 (see Figs. 6, 6B, 6D, 6E) is provided as one of a selective group of three independent systems or means for operating the bomb release mechanism. The electrically responsive system comprises an actuating cylinder or piston 99, a cartridge retainer 101, a cartridge 103, an electrically responsive primer 105, and a cover assembly 107.

The component parts of the electrically responsive system 13 are arranged substantially as an integral assembly or unit to facilitate reloading of the bomb release mechanism. The assembly is mounted within an end portion of the hook retaining group housing 47 and is arranged coaxially aligned with the operator 49 for transmitting an actuating force thereto.

The actuating cylinder or piston 99 has one end 109 thereof closed and provided with a rectangular boss or shoulder 111 extending across the external end surface thereof. When disposed in a normal operating position the shoulder 111 is arranged vertically for insertion within a cooperating, diametrically extending slot 113 provided in the adjacent end 115 of the detent release sleeve 59. The cartridge retainer 101 together with the cartridge 103 securely fastened therewithin is slidably mounted within the hollow interior of the actuating cylinder 99. The cartridge retainer end wall 117 adjacent to the closed end wall 109 of the cylinder is provided with a centrally disposed aperture 119 extending therethrough for the purpose of transmitting a fluid pressure generated by the cartridge against the retainer closed end wall thereby to operate the cylinder. The cylinder is slidably arranged for movement in axial directions between the inner wall of the hook retaining housing 47 and the outside surface of the cartridge retainer 101.

In order to prevent the escape of gases between the cartridge retainer 101 and the inner wall of the cylinder, an O ring 123 is provided which is disposed around the retainer and within an annular recess 125 provided in the cylindrical outer wall thereof. As a further safety measure to insure that a spent cartridge must be removed and a new cartridge inserted before the bomb release mechanism can be reloaded and locked in carrying position, a resilient stop ring 127 is disposed intermediate the ends of the cartridge retainer in an annular recess 129 provided on the cylindrical outer surface of the retainer. The open end 131 of the actuating cylinder opposite to the closed end 109 is provided with an annular recess 133 on the inner surface thereof adjacent to the end. Once the cartridge is detonated, the cylinder will move axially in the direction of the operator, that is, to the left as viewed in Figure 6 of the drawings. As the cylinder is disposed with its recess 133 opposite the stop ring 127, the resilient ring will spring outwardly and be disposed therewithin. With the stop ring disposed within the actuator recess, the actuator cannot be moved back to its original position after detonation of the cartridge. As a consequence thereof, the actuator will prevent the operator from being returned sufficiently to permit the ball detents 61 to assume a locked position in the housing pockets 71. Thus, the locking arrangement, provided by the stop ring 127 working in conjunction with the locking means for the detent release sleeve 59, positively insures that the old cartridge retainer assembly of the electrically responsive system must be removed and a new cartridge retainer assembly replaced before the release mechanism can be operated to permit loading a bomb in the support mechanism.

The electric primer is securely fastened and sealed within the cartridge retainer at the end 135 opposite to the apertured end wall 117. The cover assembly 107 is securely fastened by any suitable means to the primer containing end 135 of the retainer. An electrical contact pin 134 is centrally mounted in and is insulated from the retainer end for making an electrical connection between the primer and an electrical lead 137 carried by the cover assembly. The electrical lead 137 may be mounted in any suitable fashion which will be convenient for the particular arrangement or environment in which the release mechanism is to be employed. As shown in Figures 6 and 6A, the lead end is disposed axially of the housing where it makes connection with the contact pin but extends radially outwardly from the cover for suitable connection with a remote control device by way of a single contact receptacle 136 mounted within and insulated from the cover assembly. The other electrical connection is provided through the housing by way of a single contact receptacle 138 mounted in the cover assembly.

The cover assembly 107 functions somewhat like a breech to hold the cartridge in place. The design thereof is of the bayonet type for facility and positive orientation in reloading. The cap or cover 139 comprises a cylindrical member with the outer end 141 thereof closed and provided with an annular shoulder portion 143 which abuts with the end 145 of the hook retaining housing 47. The opposite or inner end 147 of the cap is provided with a pair of diametrically spaced, radially extending ears or lugs 149. The hook retaining housing end 145 is provided with an opening 151 for receiving the electrically responsive assembly. The opening 151 conforms in shape to the inner end 147 of the cap, being complementary therewith, so that the radially extending ears 149 will pass therethrough. Adjacent to the housing end 145 there is provided an annular groove 153 on the inner surface thereof for receiving the cover assembly ears 149 thereby to allow the cover assembly 107 to be rotated about its axis after being inserted in the housing. Once the cover is rotated to position the ears behind the groove wall portions 155 of the housing, the cover assembly is secured within the housing. A pin 157 is attached to the end 145 of the housing to function as a stop in controlling or limiting rotation of the cover assembly and to aid in orienting or aligning the shoulder 111 of the actuating cylinder 99 with its complementary receiving slot 113 in the operator end 115. The pin 157 extends beyond the end of the housing sufficiently so that it can be disposed within an arcuate slot 159 provided on the inner end or face 161 of the cover shoulder 143. The arcuate slot is arranged to permit the cover assembly to be rotated one quarter of a turn thereby to orient the cover assembly when it is rotated fully in a clockwise direction (as indicated by arrow A in Fig. 13).

The emergency operating system

The emergency or manually actuated fluid pressure-operating system 15 is provided as a secondary means for operating the bomb release in the event the electrically responsive system 13 should fail. The emergency system also relies upon fluid pressure to actuate the bomb release, the fluid pressure being produced by a percussion type of cartridge instead of the previously described electro-responsive type of cartridge.

The emergency operating system 15 comprises substantially a self-contained unit which is somewhat similar in construction and in operation to the initiator or fluid pressure-generating apparatus more particularly shown and described in applicant's co-pending patent application, Serial Number 353,702, filed May 7, 1953. Although the initiator referred to is a preferred type, any other percussion type which is manually operated could be substituted therefor.

The preferred type of initiator or emergency operating system 15 comprises generally a housing 163, containing a percussion type of cartridge (not shown) which is detonated by a spring loaded trigger mechanism 165. One end of the trigger mechanism extends through the housing which can be either grasped directly or connected with a lanyard or other mechanical arrangement (not shown) for remote control operation.

The initiator housing 163 is attached within the bomb release housing 5 in a suitable location which will facilitate the transmission of fluid pressure generated by the initiator to the chamber of the hook retainer housing 47 located between the operator 49 and the actuating cylinder 99 of the electrically responsive system 13. Fluid pressure from the initiator is transmitted by means of a tube 167 connected between the fluid pressure-generating chamber of the initiator and an inlet opening 169 provided in the top wall of the hook retainer housing.

The manual operating system

The manually operated mechanical system 17 (see Fig. 2) is provided as a third way of actuating the bomb release and may also be used in the event of failure of the other two operating systems. However, this system is intended primarily for use in removing a bomb from the release mechanism, in case a bombing mission is cancelled, by permitting the unloading personnel to operate the bomb release mechanism from the ground where they would be working on the bomb.

The manual system 17 essentially comprises an actuating lever 171 and a pair of keys 173, 174 (see Figs. 9, 9A, 9B). The keys are disposed for slidable movement within slots 175 (see Fig. 8) provided in opposite sides of the hook retaining group of the operator 49. The one end 177 of each key which is located next or adjacent to the detent release sleeve 59 is provided with a shoulder 179 which extends inwardly through an opening in the wall of the actuating cylinder. The shoulder extends inwardly an amount sufficient to be disposed within the deeper portion of the stepped groove 75 of the release sleeve 59. Intermediate the ends of each key another shoulder 181 is provided which extends outwardly therefrom for disposal freely within a slot or groove 183 on the inner surface of the hook retainer housing 47. With this arrangement, the keys are capable of being moved longitudinally and, since their end shoulders 179 are engaged with the release sleeve 59, movement in the direction of the operating lever 25 will release the detents 61 and unlock the operator 49. Further movement in that same direction will cause the operator to release the hook members and a bomb held thereby.

The actuating lever 171 for operating the keys 173, 174 comprises a bifurcated member having a pair of arms 185 disposed in spaced apart, parallel relation. Juxtaposed ends 186 of the arms are connected at one end by a cross member 187 which is journaled in opposite sides of the bomb release housing 5 and provides a pivotal support therefor. The opposite free ends 189 of the arms extend upwardly through openings 191 provided in the lower wall of the hook retainer housing 47. The arms are of a length sufficient to engage behind the intermediately disposed shoulders 181 of the keys 173, 174. The outer face of each arm 185 is provided with a triangular shaped opening 192 which extends inwardly along the pivotal axis and which is adapted to receive a crank (not shown) or other suitable implement to facilitate operation of the manual operating system.

The block safety group

The block safety group 18 is provided as a safety device to insure that the bomb release mechanism itself is inoperative once it is loaded and locked, as well as to connect the mechanism with a sequential firing system involving a plurality of release mechanisms. Generally, the function of the block safety group is (1) to render the mechanical parts immovable and (2) to disconnect the electrical apparatus circuitwise by means of a rotating cam arrangement.

The apparatus which fulfills these functions comprises a rotating cam 193 (see Figs. 6, 6A, 6B and 6C), a sliding key 195 and two microswitches 197, 199. The rotating cam comprises a shaft 201 having opposite ends 203 thereof journaled in oppositely disposed sides of the bomb release housing 5 and a cam member 205 which is disposed centrally and eccentrically on the shaft. The cam member is provided with a single cam surface 207 for engaging the operator 49 and a pair of cam surfaces 209 for engaging the keys 173, 174 of the manual operating system 17. Individual ones of the pair of cam surfaces are disposed on opposite sides of the single cam surface 207. The cam member is freely disposed for rotation about the shaft. A transverse groove 211 is provided in the cam member which extends radially inwardly from the bore surface through which the shaft 201 extends. The key 195 is slidably arranged within the transverse groove so that it is capable of movement axially with respect to the shaft. On the side of the key adjacent to the shaft and substantially midway between the ends thereof there is provided a laterally extending stud 213. A spiral-like groove 215 is provided in the shaft which is located centrally thereof and which encircles the shaft substantially 180 degrees. The key stud 213 is freely disposed within the shaft groove for cooperation with the shaft sides defining the groove in a manner to be explained subsequently. Thus, the arrangement of the shaft 201, cam member 205 and sliding key 195 are movable relative to each other.

Operation of the block safety group is accomplished by the use of a special key (not shown) which is complementary to a square recess 216 provided axially within opposite ends of the cam shaft 201. Thus, the same key used to operate the block safety group cannot be used to operate the manually operated mechanical system since the latter requires a lever or key having means complementary to a triangular shaped opening 192.

The microswitches 197, 199 are located diametrically above and below the rotating cam shaft 201 for operation by the pair of cam surfaces 209. The switches function primarily to connect and disconnect the apparatus electrically thereby to prevent premature operation subsequent to the release mechanism being loaded. Secondarily, they function to operate lights on a control panel thereby to enable an operator to determine the operating condition of the particular associated release mechanism.

The microswitches are of the type operable by an axially movable plunger or rod 217 and whereby a relatively small movement suffices to change the switch from on to off or vice versa. The respective plungers of the two switches extend through extensions 219 of two opposite sides of the hook retaining group housing 47. As shown particularly in the series of Figure 7, the "safety-on" switch 197 is located above the shaft 201 with its plunger extending downwardly through the housing side seen at the left in the view. The "safety-off" switch 199 is located below the shaft 201 with its plunger extending upwardly through the housing side seen at the right in the view. Both plungers are of a length arranged for movement into and out of recesses 221, 223 respectively provided in the housing sides vertically above and below the shaft 201. The recesses are of a size sufficient to accommodate the ends of the sliding key 195. A portion of each end of the key is tapered on the side opposite that from which the lateral stud 213 extends, thereby to provide a cam surface for operating the plungers 217.

Although any suitable arrangement may be provided for effecting electrical control of the apparatus from a remote location, for purposes of explanation, it may be assumed that the "safety-off" switch 199 is a single pole, single throw switch connected with an indicator light (not shown) on the control panel and which is normally open but can be closed by the key moving the plunger downwardly. It may also be assumed that the "safety-on" switch 197 is a double pole, single throw switch having one circuit connected with the electrically responsive cartridge group and which is normally open, and the other circuit connected with an indicator light (not shown) on the control panel and which is normally closed. The arrangement of the "safety-on" switch is such as to permit breaking the firing circuit at the same time the switch controlling the indicator light is actuated thereby to prevent inadvertent firing of the electrically responsive cartridge 103 while the safety is in the "safety-on" position.

In the event the bomb release mechanism is one of a plurality of release mechanisms which are controlled for sequential operation by a suitable electrical system, a sequential and ready-to-fire switch 225 is provided which is arranged for operation by one of the slidable keys 173 of the manually operated mechanical system 17. The sequential and ready-to-fire switch, like the microswitches 197, 199, is responsive to movement of a spring biased plunger 227. The plunger extends downwardly from the switch, through a side wall of the housing and into the slot 183 in which the laterally extending shoulder 181 is moved. Cam surfaces 229 are provided on the upper leading and trailing edges of the key shoulder for engagement with the plunger 227 thereby to open and close the circuit associated with the sequential and ready-to-fire switch in a manner similar to the microswitches.

OPERATION OF THE BOMB RELEASE MECHANISM

The bomb release mechanism of the present invention is designed as a self-contained unit which is capable of being electrically or mechanically actuated to permit the controlled release of the store or bomb at the will of the bombardier. In addition thereto, the mechanism is designed so that it is capable of operation as an individual unit or as one of a plurality of units in a sequential bomb release system.

The apparatus of the present invention contemplates that the bomb release mechanism is susceptible of operation as an individual unit; it is also arranged for operation in a sequential firing system employing a plurality of bomb release mechanisms of like kind. Since the description herein relates to a single, preferred embodiment, the bomb release mechanism is shown and described as a complete unit for use in a sequential firing system. It will be recognized, however, that, should the apparatus not be used in such a system but as an individual unit, the various microswitches and the associated parts for operating them will not be necessary and may be eliminated without affecting operation of the bomb release mechanism itself. For the purpose of explanation, operation of the bomb release mechanism will be described as if the unit was one unit in a sequential firing system.

Let it be assumed that the device of the present invention has been loaded with a bomb in the locked, sustained position, as particularly shown in Figure 2 of the drawings. The apparatus must be conditioned for operation before either of the release systems can be actuated to release the bomb or store. Starting from the locked position, the rotating cam 193 is disposed in a clockwise, fully rotated position as viewed in Figure 6 of the drawings, in which position the operator 49 and the keys 173, 174 of the manual operating system are held in an extreme position to the right. In addition, the sliding key 195 is disposed above the cam shaft 201 and in an extreme left position within the recess 221 associated with the "safety-on" microswitch 197 (see Figure 7). In this position of the key, the "safety-on" plunger 217 is held upwardly by the key to close the associated circuit and energize the indicator light on the control panel connected therewith. At the same time, the recess 223 associated with the "safety-off" microswitch 199 is clear and the plunger of the switch is disposed in an upper position to disconnect the circuits associated with the electrically responsive operating system and the indicator light on the control panel.

Next in order, to condition the device for operation by any one of the selective operating means, it is necessary to first rotate the cam 193 with the aid of a key having a square stud substantially 180 degrees to a fully counter-clockwise position as shown in Figure 6A. In so doing, the cam is no longer engaged with the operator 49 or the keys 173, 174 so that they are now unlocked or free for movement toward the cam shaft 201.

In rotating the cam from its locked to its unlocked positions, not only are the operator 49 and keys 173, 174 unlocked, but the condition of the apparatus is automatically indicated on the control panel and the electrically responsive operating mechanism is connected in circuit with the control panel through the microswitches 197, 199 and the sequential and ready-to-fire switch 225. Referring particularly to the series of Figures 6 and 7 in the drawings, the cam shaft 201 is shown at various stages during rotation counterclockwise. Since the sliding key 195 is disposed within the "safety-on" recess 221, it prevents the cam 193 from being rotated and closes the "safety-on" microswitch circuit. Therefore, during the first 90 degrees of rotation of the cam shaft the spiral-like groove 215 causes the key stud 213 and the key 195 to move axially along the shaft until the key abuts the side of the hook retaining group housing oppositely disposed with respect to the "safety-on" recess 221, the position shown in Figure 7A. In addition thereto, movement of the key opens the "safety-on" microswitch circuit. In this position, the key is disposed between opposite sides of the housing and is free to rotate with the cam shaft. Continued rotation of the cam shaft an additional 180 degrees will move the cam and key to the position shown in Figure 7B where the cam is limited against further rotation by a stop 231 provided by one of the mounting pins or any other suitable means. In this position, the key is disposed beneath the cam shaft in alignment with the "safety-off" microswitch recess 223. Additional rotation of the cam shaft another 90 degrees will cause the key to move axially relative to the shaft and into the recess 223 to the position shown in Figure 7C where it will operate the "safety-off" microswitch and close the circuits thereof.

Operation of the hook and hook retaining groups

The hook and hook retaining groups have control over supporting and releasing the store or bomb. Although these groups may be actuated by any one of the three operating systems, the operation thereof will be the same.

Starting with the condition that the hook retaining group members are in a locked, supporting position, as shown particularly in Figure 6 of the drawings, but with the cam 193 in an unlocked position, the detent locking means 51 must first be released before the operator 49 can be moved. This is accomplished by moving the detent release sleeve 59 axially to the left, as viewed in the series of Figures 6, movement being effected through operation of any one of the three systems described in detail hereafter. The sleeve is moved against the action of the associated coil spring 79 to an extent limited by the sleeve flange 77 engaging the open end of the operator 49. This movement aligns the small diameter portion of the stepped groove 75 which the operator apertures 67. The ball detents 61 are then free to move radially inwardly, as shown in Figure 6A. Further movement of the sleeve toward the rotating cam forces the ball detents out of locking engagement with the pockets 71 thereby releasing the operator 49. Since the keys 173, 174 are engaged with the sleeve 59, they will move with the sleeve causing the plunger 227 of the sequential and ready-to-fire microswitch 225 to disengage from the shoulder 181 of the key 173 (in the manner illustrated by Figures 10 and 10A of the drawings) thereby to operate the sequential and ready-to-fire microswitch. Once the operator is free, continued force or pressure acting on the sleeve and plunger in the direction of the cam will move the operator until it is stopped by the cam, as indicated in Figure 6B. The operator will thereby transmit this force to the operating lever 25 causing the lever to move counterclockwise.

Movement of the lever 25 counterclockwise will cause the horizontal arm 39 thereof to move downwardly carrying with it the adjacent ends of the connecting links 23, in the manner shown particularly in Figures 2A and 2B. Since the outwardly extending shoulders 31 of the hook members 21 are disposed within the recesses defined by the support plate shoulders 29 the hook members cannot move downwardly until the shoulders 31 are withdrawn from the recesses. The links function in the general order of a knuckle joint so that downward movement of the connecting links' adjacent ends first causes the withdrawal of the hook member shoulders and next forces the hook members downwardly. As soon as the outwardly extending lower shoulders 35 clear the lower edges of the support plate faces 27, the weight of the store is sufficient to cause the hook members to separate and release the store, as shown in Figure 2B.

It will be noted that the arrangement of parts is such that, instead of the hook members actually holding the weight of the store in bending, they more or less sustain the load on the plate shoulders. In addition thereto, it will be observed that the mechanism is susceptible of carrying extremely heavy loads without danger of jamming. This is largely due to the fact that, if the operating lever 25 moves at a velocity that is greater than the velocity that would be imparted to the suspension lug 7 by the weight of the store, the locking surfaces, that is, the supporting shoulders, would be relieved of the stress caused by the heavy load until they are entirely withdrawn and free to permit the hook members to move downwardly. Thus, it will be observed that the bomb lug is first ejected or forced downwardly clear of the mechanism before the jaws can be opened sufficiently to release the bomb.

It will be further noted that, once the hook retaining group members have been operated to effect release of a bomb or store, the present invention also provides a safety device to prevent the apparatus from being reloaded and reset without an electrically responsive cartridge being properly positioned in the apparatus and ready for use. This safety function is accomplished through operation of the inner cylinder or plunger 63. As long as the closed end 109 of the plunger remains flush with the flanged outer end 77 of the detent release sleeve, no locking action takes place. As soon as the boss 111 of the actuating cylinder 99 of the electrically responsive system 13 is removed from its normal position in abutment with the detent release sleeve 59 and the plunger 63, the plunger coil spring 89 urges the plunger outwardly from its flush position within the detent release sleeve. This movement of the plunger causes the locking pins or detents 65 to be forced into the annular groove 97 of the operator under the influence of the plunger cam surface 93. Removal of the flanged outer end 77 from abutment with the detent release sleeve and plunger is accomplished in either one of two ways: first, should the electrically responsive cartridge have been expended to operate the bomb release, when the assembly of parts constituting the electrically responsive system 13 is removed for replacement with a good cartridge, it will release the plunger, as shown by Figures 6B and 6C; and second, should the emergency or manual operating systems have been used to operate the bomb release, as soon as the operator 49 is moved toward the cam member 193 so that the detent release sleeve and plunger are no longer in abutment with the actuating cylinder 99, as shown in Figures 11 and 11A, the plunger will be released and the plunger spring 89 will force the plunger outwardly into locking position.

*Operation of the electrically responsive fluid pressure system*

The apparatus is designed to function primarily by the aid of the electrically responsive fluid pressure system. This system is responsive to detonation of a small electric primer 105 initiated by electrical energy supplied under the control of an operator. Once the electric primer is detonated, it will cause detonation of the cartridge 103. The expanding gases resulting from detonation of the cartridge are permitted to escape through the end wall aperture 119 of the cartridge retainer and to exert a pressure force against the actuating cylinder 99 causing it to move in the direction of the rotatable cam 193. Since the actuating cylinder abuts the detent release sleeve 59, the latter member moves with the actuating cylinder to effect release of the operator 49. The expanding gases are sufficient, once the operator is released, to actuate the hook retaining group components in the manner aforesaid to release the bomb.

It will be observed that, as a safety feature to prevent return of the actuating cylinder to its original position, which otherwise would permit resetting of the hook retaining and hook group components before the detonated electrically responsive cartridge is replaced with a new one, the stop ring 127 is disposed within the cylinder recess 133 once the actuating cylinder is moved to an extreme release position to the left, as in the position shown in Figure 6B of the drawings. Thus, removal of the expended cartridge is a necessity before the bomb release mechanism can be reloaded or reset.

*Operation of the emergency system*

As explained hereinabove, the emergency operating fluid pressure system is of the percussion type which depends upon an operator detonating a cartridge by mechanical means. Although a preferred type of initiator or fluid pressure generating apparatus is explained more fully in applicant's aforesaid copending application, Serial Number 353,702, operation thereof may be explained briefly for the purposes herein. The mechanism is triggered by withdrawing the pin 233 against the action of a spring (not shown). A firing pin (not shown) is released by the pin and forced against a percussion cap to fire a cartridge. Detonation of the cartridge generates expanding gases which are transmitted through the tube 167 and the hook retainer housing opening 169 into the chamber space between the actuating cylinder 99 and the detent release sleeve 59. In turn, the expanding gases force the detent release sleeve away from the actuating cylinder toward the cam 193 to operate the hook retaining group and hook group components in the manner described above for releasing a bomb.

*Operation of the manual system*

The manual operating system 17, apart from its primary function of removing a bomb from the bomb release mechanism in case of the cancellation of a bombing mission, is useful also as an alternative means for operating the bomb release should the fluid pressure-responsive systems fail.

Operation of the manual system is effected by inserting a crank into the triangular shaped opening 192 provided in the arms 185 and rotating the crank and arms in a counterclockwise direction as considered in the view shown by Figure 2 of the drawings. Rotation of the crank and arms in this manner causes the free ends 189 of the arms to move the keys 173 in a direction toward cam 193. Since the end shoulders 179 of the keys are engaged with the detent release sleeve 59, the release sleeve will move with the keys and operate the hook retaining group and the hook group components, in the manner prescribed above for releasing a bomb.

*Reloading the bomb release*

As mentioned hereinabove, before a bomb or store can be reloaded in the bomb release, the electrically responsive system must be conditioned and ready for operation. In the event the electrically responsive cartridge has been used, it is removed by rotating the cap or cover 139 counterclockwise to align the ears or lugs 149 with mutual complementary portions of the opening 151 and withdrawing the assembly in an axial direction. Replacement of a new assembly is accomplished in the same way but in an opposite sense, care being exercised to insure that the orienting and stop pin 157 is disposed within the arcuate slot 159 of the cover shoulder 143.

Once a new, unused electrical cartridge is oriented in position, the bomb release is ready to load a bomb. In loading a bomb, the bomb suspension bar 7 is first put into the slots 30 of the bomb release housing. The suspension bar is then moved upwardly within the slots and between the support hooks 21 until it contacts the free end depending portion 43 of the operating lever 25. Continued upward movement causes simultaneous movement of the hook members 21 upwardly and the movement of the operating lever in a clockwise sense as viewed in Figure 2C. The outwardly extending lower shoulders 35 of the hook members are arranged to form an arcuate surface 237 on the upper side thereof. This arcuate surface coacts with the inside lower edge 239 of the support plates 19 to guide the hook members toward each other into a closed support position under the bomb suspension bar. At the same time, the operating lever depending portion 43 together with the coaction of the connecting links 23 forces the upper shoulder portions 31 of the hook members away from each other into the support plate recesses for support on the shoulders 29 thereof.

The clockwise rotation of the operating lever 25 forces movement of the operator 49 away from the rotating cam 193. As the operating lever approaches the extreme clockwise rotated position, the operator first causes the plunger to engage the rectangular shoulder 111 of the actuating cylinder 99. At this point, the ball detents 61 have not yet been aligned with the hook retainer housing pockets 71 and the detent release sleeve 59 is locked against movement relative to the operator with its shoulder 77 abutted with the open end 57 of the operator. As the operator and release sleeve are moved toward the cartridge and relative with respect to the plunger, the locking pins 65 are released thereby releasing the detent release sleeve from the operator. At this position, the ball detents are disposed opposite the pockets. The detent release sleeve, under the influence of the coil spring 79, will be moved outwardly from the operator causing the ball detents to be disposed within the pockets to lock the operator against movement and to dispose the shoulder 111 within the slots 113 of the detent release sleeve. This, of course, prevents removal of the electrically responsive operating members while a bomb is loaded and locked into position. It will be recognized, however, that if the shoulder cannot be disposed within the sleeve slots, the ball detents will prevent the apparatus from being locked should the electrically responsive cartridge be only partially inserted or partially locked in place.

Inasmuch as the keys 173, 174 of the manual operating system 17 are engaged with the detent release sleeve 59, they will move with the sleeve with the result that, as the switch plunger 227 of the sequential and ready-to-fire microswitch engages the cam surface of the key shoulder 181, it will force the plunger upwardly and operate the switch to indicate the condition of the apparatus at that time.

The next step is to actuate the block safety group 18 to render the parts immovable and insure that the bomb release mechanism is inoperative. This is accomplished by rotating the cam 193 in a clockwise direction as viewed in Figure 1. In so doing, the sliding key 195 is first removed from the recess 223 by rotating the shaft 201. This permits the plunger 217 of the "safety-off" microswitch 199 to move upwardly into the recess and operate the microswitch to indicate the condition of the apparatus on the control board. Further rotation of the shaft rotates the cam to engage the single surface 207 thereof with the operator 49 and to engage the pair of surfaces 209 thereof with the keys 173, 174. As the cam approaches the extreme clockwise position, as shown in Figure 6, it insures that the plunger cannot be moved. The cam also serves as a check to insure that the detent release sleeve has forced the ball detents 61 into the hook retainer housing pockets 71 by engaging the ends of the keys and forcing them along with the detent release sleeve away from the cam thereby forcing the ball detents into locking position if they have not already been so disposed. Further rotation of the shaft 201 forces the sliding key 195 in an axial direction to dispose the end thereof into the recess 221 associated with the "safety-on" microswitch 197. In so doing the key engages the plunger 217 of the "safety-on" microswitch to move it upwardly and operate the microswitch thereby to indicate the completely locked condition of the apparatus.

From the foregoing description it will be recognized that, in reloading the apparatus, at least two of the operating systems must be conditioned and ready for operation. Not only must the electrically responsive system have an unused cartridge installed in the bomb release but it must be properly oriented before the bomb release can be reloaded. In addition, during the reloading of the bomb release, movement of the hook retaining group members automatically repositions the components of the manually operated mechanical system. Although the bomb release can be reloaded without reconditioning the emergency fluid pressure-operating system, the preferred form of this system's apparatus selected for the present invention contemplates the removal of a part of the trigger mechanism upon operation of the fluid pressure initiation. This, of course, would be readily apparent to a person reloading the bomb release and would require replacement of the unit before the apparatus would be fully conditioned for operation.

SUMMARY

It will be appreciated from the foregoing description that the design of the preferred embodiment of the present invention insures ease of production and general maintenance. The apparatus is a compact, self contained unit which permits the controlled release of the store at the will of the operator. The operation of the several units of the assembly is such that there is no possibility of either partially locking the store in position while reloading or partially releasing the store when actuated.

It will now be apparent that the carry and release mechanism of the present invention is so arranged that it is capable of operation by any one of three selected systems, thus insuring positive discharge of the store. Although the apparatus is particularly adapted as a release device for bombs carried by aircraft, it will be apparent to persons skilled in the art that the invention may be embodied in any device capable of supporting an object for subsequent release and wherein similar problems are met.

Although but a single preferred embodiment of the present invention is shown and described herein, it will, no doubt, be apparent to those skilled in the art that many other forms thereof, as well as changes in the preferred embodiment, are possible within the spirit of the present invention. For example, as suggested above, the carry and release mechanism may be employed as a single unit rather than as one of a plurality of units in a sequential operating system. In such case, the microswitches and associated parts required to operate them may be eliminated without departing from the safety and selective operating features introduced by the present invention. Therefore, it is desired that the particular form of the invention shown and described herein be considered as illustrative and not as limiting.

I claim:

1. In an aerial carry and release mechanism, the combination of a pair of supports having opposed and substantially parallel surfaces terminating in adjacent holding and release grooves, a pair of hooks having upper extensions adapted to cooperate with said grooves and lower extensions adapted to engage said parallel surfaces only when said upper extensions engage said holding grooves, a lever, and a pair of links each pivoted to said lever at one end and to a different one of said hooks at the other end for moving said upper extensions from one to another of said grooves.

2. In an aerial carry and release mechanism, the combination of a pair of supports having opposed and substantially parallel surfaces terminating in adjacent holding and release grooves, a pair of hooks having upper extensions adapted to cooperate with said grooves and lower extensions adapted to engage said parallel surfaces only when said upper extensions engage said holding grooves, a lever, and a pair of links arranged between said lever and said hooks to move said upper extensions from said holding grooves to said release grooves in response to operation of said lever.

3. In a aerial carry and release mechanism, the combination of a pair of supports having opposed and substantially parallel surfaces terminating in adjacent holding and release grooves, a pair of hooks having upper extensions adapted to cooperate with said grooves and lower extensions adapted to engage said parallel surfaces only when said upper extensions engage said holding grooves, a lever, a pair of links arranged between said lever and said hooks to move said upper extensions from one to another of said grooves in response to operation of said lever, means for locking said lever in a position with said upper extensions in said holding groove, and indicating means responsive to operation of said locking means between its locked and unlocked positions.

References Cited in the file of this patent

UNITED STATES PATENTS

| | | |
|---|---|---|
| 2,150,933 | McNeill et al. | Mar. 21, 1939 |
| 2,206,777 | Kee | July 2, 1940 |
| 2,466,980 | Bronson | Apr. 12, 1949 |
| 2,535,095 | Schwartz et al. | Dec. 26, 1950 |
| 2,604,353 | Pierson et al. | July 22, 1952 |
| 2,699,908 | Fletcher | Jan. 18, 1955 |
| 2,726,576 | Musser | Dec. 13, 1955 |
| 2,736,522 | Wilson | Feb. 28, 1956 |

FOREIGN PATENTS

| | | |
|---|---|---|
| 295,784 | Great Britain | Aug. 23, 1928 |
| 404,775 | Great Britain | Jan. 25, 1934 |
| 609,456 | Great Britain | 1947 |